United States Patent
Garg et al.

(10) Patent No.: US 12,141,757 B1
(45) Date of Patent: *Nov. 12, 2024

(54) SYSTEM, METHOD, AND COMPUTER PROGRAM FOR AUTOMATICALLY PREDICTING THE JOB CANDIDATES MOST LIKELY TO BE HIRED AND SUCCESSFUL IN A JOB

(71) Applicant: Eightfold AI Inc., Mountain View, CA (US)

(72) Inventors: Ashutosh Garg, Sunnyvale, CA (US); Varun Kacholia, Sunnyvale, CA (US)

( * ) Notice: Subject to any disclaimer, the term of this patent is extended or adjusted under 35 U.S.C. 154(b) by 1061 days.

This patent is subject to a terminal disclaimer.

(21) Appl. No.: 17/067,712

(22) Filed: Oct. 11, 2020

Related U.S. Application Data

(63) Continuation of application No. 16/558,093, filed on Aug. 31, 2019, now Pat. No. 10,803,421, which is a continuation of application No. 16/121,401, filed on Sep. 4, 2018, now abandoned.

(51) Int. Cl.
   *G06Q 10/1053* (2023.01)
   *G06N 5/022* (2023.01)

(52) U.S. Cl.
   CPC ......... *G06Q 10/1053* (2013.01); *G06N 5/022* (2013.01)

(58) Field of Classification Search
   None
   See application file for complete search history.

(56) References Cited

U.S. PATENT DOCUMENTS

| | | |
|---|---|---|
| 9,665,641 B1 | 5/2017 | Zhang |
| 2006/0235884 A1 | 10/2006 | Pfenniger et al. |
| 2011/0055098 A1 | 3/2011 | Stewart |
| 2011/0276505 A1 | 11/2011 | Schmitt |
| 2013/0096991 A1 | 4/2013 | Gardner et al. |
| 2014/0122355 A1 | 5/2014 | Hardtke et al. |
| 2014/0330734 A1 | 11/2014 | Sung et al. |
| 2015/0161567 A1 | 6/2015 | Mondal et al. |
| 2015/0317610 A1 | 11/2015 | Rao et al. |
| 2016/0098686 A1 | 4/2016 | Younger |
| 2017/0344555 A1 | 11/2017 | Yan et al. |

(Continued)

OTHER PUBLICATIONS

A Novel Approach for Learning How to Automatically Match Job Offers and Candidate Profiles (Year: 2016).*

(Continued)

*Primary Examiner* — Dennis W Ruhl
(74) *Attorney, Agent, or Firm* — Zhong Law, LLC

(57) ABSTRACT

A method and system for predicting a match between a candidate and a job position for an organization include generating an enriched talent profile associated with the candidate, the enriched talent profile comprising first characteristic values and second characteristic values, wherein the first characteristic values relate to characteristics verifiably possessed by the candidate, and second characteristic values are predicted values by executing a first neural network module, generating a calibrated job profile for the job position, the calibrated job profile comprising job requirements for the job position, and executing a second neural network module using the enriched talent profile and the calibrated job profile as inputs to calculate one or more hire-related prediction values for the candidate.

20 Claims, 10 Drawing Sheets

(56) References Cited

U.S. PATENT DOCUMENTS

| | | | |
|---|---|---|---|
| 2017/0357945 A1* | 12/2017 | Ashkenazi | G06Q 10/1053 |
| 2018/0039946 A1 | 2/2018 | Bolte et al. | |
| 2018/0218330 A1 | 8/2018 | Choudhary et al. | |
| 2018/0308061 A1 | 10/2018 | Jadda et al. | |
| 2019/0114593 A1* | 4/2019 | Champaneria | G06F 16/3326 |
| 2019/0130281 A1* | 5/2019 | Yang | G06N 3/044 |
| 2019/0197487 A1 | 6/2019 | Jersin et al. | |
| 2019/0205838 A1* | 7/2019 | Fang | G06Q 10/06398 |
| 2019/0220824 A1* | 7/2019 | Liu | G06Q 10/1053 |
| 2019/0303798 A1* | 10/2019 | Xie | G06Q 50/01 |
| 2020/0065769 A1* | 2/2020 | Gupta | G06Q 10/1053 |

OTHER PUBLICATIONS

Customerglu "Hire the best candidate for your Company using Artificial Intelligence" (2016), medium.com/SCustomerGlu, 2016, 5 pages.

\* cited by examiner

Creating an Enriched Talent Profile

Analyze the organization's human resource data on candidates to extract values for (1) employment roles and corresponding companies and skills associated with the roles, and (2) schools and fields of study assocaited with the candidate ("profile data"). Profile data may also include hobbies and interests.
410

↓

Analyze values extracted in step 410 in accordance with similarity models to obtain a vector representation of the values in a space where similar values are in close proximity (the "similarity data")
420

↓

Analyze public data sources for candidate activity and work product ("supplemental candidate data")
430

↓

Obtain data pertaining to related entities (*e.g.*, current employer, peers at current employer, etc.)
440

↓

Derive personality and talent insights from candidate profile data, supplemental candidate data, and related-entity data (*e.g.*, quality of a candidate's education, career growth progression, skills depth, types of industry experience, etc.)
450

↓

Predict a next role for a candidate using a neural network trained on employment history of many candidates
455

↓

Create an enriched talent profile for the candidate including the profile data, the similarity data, the supplemental candidate data, the related-entity data, the talent insights and personality insights for the candidate, and the candidate's predicted next role
460

FIG. 4

Example System Architecture

SYSTEM, METHOD, AND COMPUTER PROGRAM FOR AUTOMATICALLY PREDICTING THE JOB CANDIDATES MOST LIKELY TO BE HIRED AND SUCCESSFUL IN A JOB

1. CROSS-REFERENCE TO RELATED APPLICATION

This is a continuation application of U.S. application Ser. No. 16/558,093 filed Aug. 31, 2019 which is a continuation application of U.S. application Ser. No. 16/121,401 filed Sep. 4, 2018, the contents of which are incorporated by reference in their entirety.

2. FIELD OF THE INVENTION

This invention relates generally to machine learning in human resource applications, and more specifically to using machine learning and enriched candidate and job profiles to predict the candidates most likely to be hired and successful in a job.

3. DESCRIPTION OF THE BACKGROUND ART

Hiring for a job and looking for a job can be frustrating experiences for both companies and applicants. Human resource (HR) personnel are often overwhelmed by the volume of resumes they receive, and they find it difficult to determine which are the best candidates for a job position. Candidates complain of applying to many corporations and never receiving response, even if they are well-qualified for a posted job.

Some software solutions exist for enabling an HR department to automatically identify relevant candidates. As illustrated in FIG. 1, such solutions match resumes (110) to job descriptions (120) using keywork matches and Boolean searches. There are several disadvantages with these solutions:

1. Poor recall: A keyword search is dependent on qualified candidates using the same or similar keywords as the job description. If the job description is too specific, qualified candidates who should be considered will be excluded, resulting in too many "false negative" non-matches. If the job description is too broad, then many candidates will match the job description, resulting in many "false positive" matches.
2. Poor precision: HR managers are unable to make sophisticated queries using systems based on keyword matches. For example, one cannot search for applicants having a top 20% career trajectory at their current employer.
3. No context: Systems based on keyword matches have no understanding of the skill depth of candidates, learnability of new skills, relevancy of industry experience, personality traits, etc. Likewise, such systems have no understanding of the qualifications of successful past and current applicants for a role, the similarities and differences between companies, roles, skills, and schools, etc.

Even if keywords in a resume match a job description, a candidate may not be qualified for the position in question. For example, the keywords in a resume for a software engineer with machine learning experience in the petroleum industry may match the keywords in a job description for a software engineer position requiring machine learning at a social networking company. However, because the industries are so different, the software engineer with petroleum industry experience may not be a good fit for the social networking company. Without context, existing solutions will produce these "false positive" matches.

Conversely, an applicant may be missing a skill listed in a job description, but that skill may be very learnable by the applicant. Existing solutions have no understanding of learnability of skills, which results in many "false negative" non-matches.

Therefore, there is a need for an improved matching system with a better understanding of both (1) candidates' experiences, traits, and current and future capabilities and (2) the experiences, traits, and capabilities that lead to success in a job.

SUMMARY OF THE DISCLOSURE

The present disclosure describes a system, method, and computer program for automatically predicting which candidates, out of a plurality of candidates, are most likely to be hired and successful in a job. An enriched talent profile is created for each of the candidates that includes the candidate's profile/resume data; supplemental data obtained by analyzing public data sources for candidate activity and/or work product; data that enables the system to understand what roles, skills, companies, schools, and fields of study are similar to the candidate's roles, skills, companies, schools, and fields of study; data pertaining to the candidate's peers and other related entities; talent and personality insights derived for the candidate; and a predicted next role for the candidate. This provides the system with a deeper understanding of each candidate beyond what is typically in a resume.

Likewise, a calibrated job profile is created for a job opening that includes the skills, experiences, and traits of identified "ideal candidates" for the job. The calibrated job profile provides the system with a deeper understanding of the skills, experiences, and traits required to be hired and successful in the job.

The ideal candidates in the calibrated job profile may be identified automatically by selecting people that currently have the same role as the open job position or previously had the role. In one embodiment, the system looks at both people in the role or previously in the role at the hiring organization and at other similar organizations. Ideal candidates also may be manually entered by a user.

The calibrated job profile also includes job requirements and preferred/required personality or talent traits inputted by a user of the system, such as a human resources manager. In certain embodiments, the calibrated job profile includes the skills, experiences, and traits of identified "unqualified candidates" for the job. The system may select unqualified candidates by identify candidates that were previously rejected for the role at the hiring organization or at similar organizations. The calibrated job profile may also include enriched talent profiles of team members for the open role at the hiring organization.

A deep neural network is used to match enriched talent profiles to calibrated job profiles. The output of the deep neural network is one or more hiring-related predictions for each candidate/job pair inputted into the DNN. The enables the system to predict the candidates that are most likely to be hired and successful in a job. The top n candidates with the highest probability of being hired and successful are displayed in a user interface.

In one embodiment, a method for identifying the top n candidates for a job position comprises:

creating enriched talent profiles for a plurality of candidates for an organization by performing the following for each of the plurality of candidates:
   analyzing human resource (HR) data to identify (1) employment roles held by the candidate and corresponding companies and skills associated with the roles, and (2) schools and fields of study associated with the candidate ("profile data");
   analyzing public data sources for candidate activity and/or work product ("supplemental candidate data");
   analyzing one or more data sources for data pertaining to entities related to the candidate's experiences ("related-entity data"), wherein the related-entity data includes data related to skills of peers of the candidate at the candidate's current employer;
   identifying skills, companies, roles, schools, and fields of study similar to the candidate's skills, companies, roles, schools, and fields of study and generating data that provides the system with an understanding of how the candidate's roles, skills, companies relate to other roles, skills, companies, and education ("similarity data");
   deriving personality and talent insights for the candidate from the profile data, supplemental candidate data, and the related-entity data;
   predicting a next role for the candidate;
   creating an enriched talent profile for the candidate includes the profile data, the supplemental candidate data, the related-entity data, the similarity data, the derived personality and talent insights for the candidate, and the predicted next role;
creating a calibrated job profile for an open job position by performing the following:
   providing a first user interface via which a user can provide job requirements for an open job position, as well as one or more preferred or required personality and/or talent traits, wherein the personality and/or talent traits selectable in the user interface correspond to one or more of the personality and/or talent insights derived by the system in creating the enriched talent profiles;
   receiving via the user interface job requirements for the open job position, as well as one or more preferred or required personality and/or talent traits;
   identifying ideal candidates for the open job position and their corresponding experiences, skills, and personality and/or talent traits;
   creating a calibrated job profile with the job requirements, the ideal candidates and their corresponding experiences, skills, and personality and/or talents traits, and the one or more preferred or required talent and/or personality traits for the open job position;
inputting data from the enriched talent profiles for the candidates and the calibrated job profile into a deep neural network;
for each of the candidates corresponding to the enriched talent profiles, obtaining from the deep neural network one or more hiring-related predictions related to the candidate and the open job position; and
calculating a match score for each of candidates with respect to the open job position based on the one or more hiring predictions; and
displaying the top n candidates for the job position based on the match score in a second user interface, where n is a positive integer.

In certain embodiments, the profile data also includes hobbies and/or interests.

In certain embodiments the system enables the user to refine the job requirements after displaying the top n candidates, and wherein, in response to the user refining the job requirements, the system creates a second calibrated job profile for the open job position based on the refined job requirements and repeats the inputting, calculating, and displaying steps based on the second calibrated job profile.

BRIEF DESCRIPTION OF THE DRAWINGS

FIG. 4 is a flowchart that illustrates a method for creating an enhanced talent profile for a candidate according to one embodiment.

DETAILED DESCRIPTION OF THE PREFERRED EMBODIMENTS

As stated above, the present disclosure describes a system, method, and computer program for predicting which of an organization's candidates, out of all the organization's candidates, are most likely to be hired and succeed with respect to an open job position at the organization. The method is performed by a computer system ("the system"). To make this prediction, the system obtains a deeper understanding of candidates' experiences, traits, and present and future capabilities beyond what is in a resume. This deeper understanding of a candidate is reflected in an "enriched talent profile" for the candidate, which is described below. The system also obtains a deeper understanding of the experiences, traits, and capabilities for being hired and successful at a role beyond what is in a job description. This deeper understanding of what it takes to be hired and successful at a role at an organization is reflected in a "calibrated job profile" for the role, which is also described below.

Data from enriched talent profiles and calibrated job profiles from earlier points in time, as well as the corresponding interview/hiring results, are used to train a DNN, which learns the data relationships and patterns that best predict which candidates are likely to be successful in the hiring process for a particular job at a particular organization. The DNN is able to discover unforeseen patterns and relationships between candidate and job data that humans alone could not ascertain. This enables the DNN to make future predictions on which candidates are likely to be hired and successful in a particular role.

The terms "organization" or "company" may be used interchangeably herein and refer to a company or other organization that employs people.

1. Overview of Prediction Process

Figure 1:
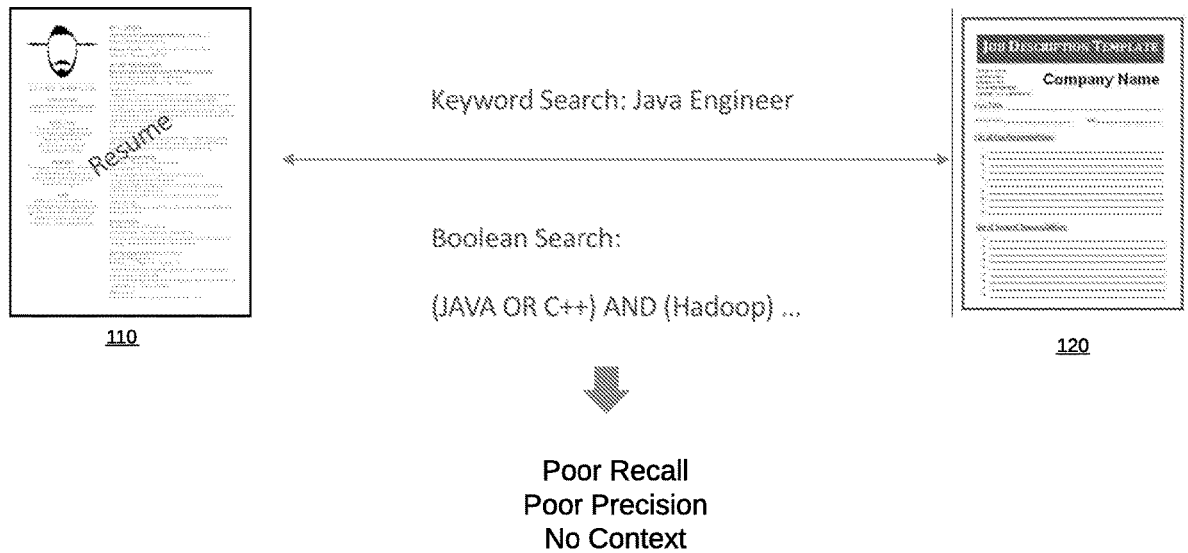
FIG. 1 is a block diagram that illustrates a prior art process of matching resumes to job descriptions.
Figure 2:
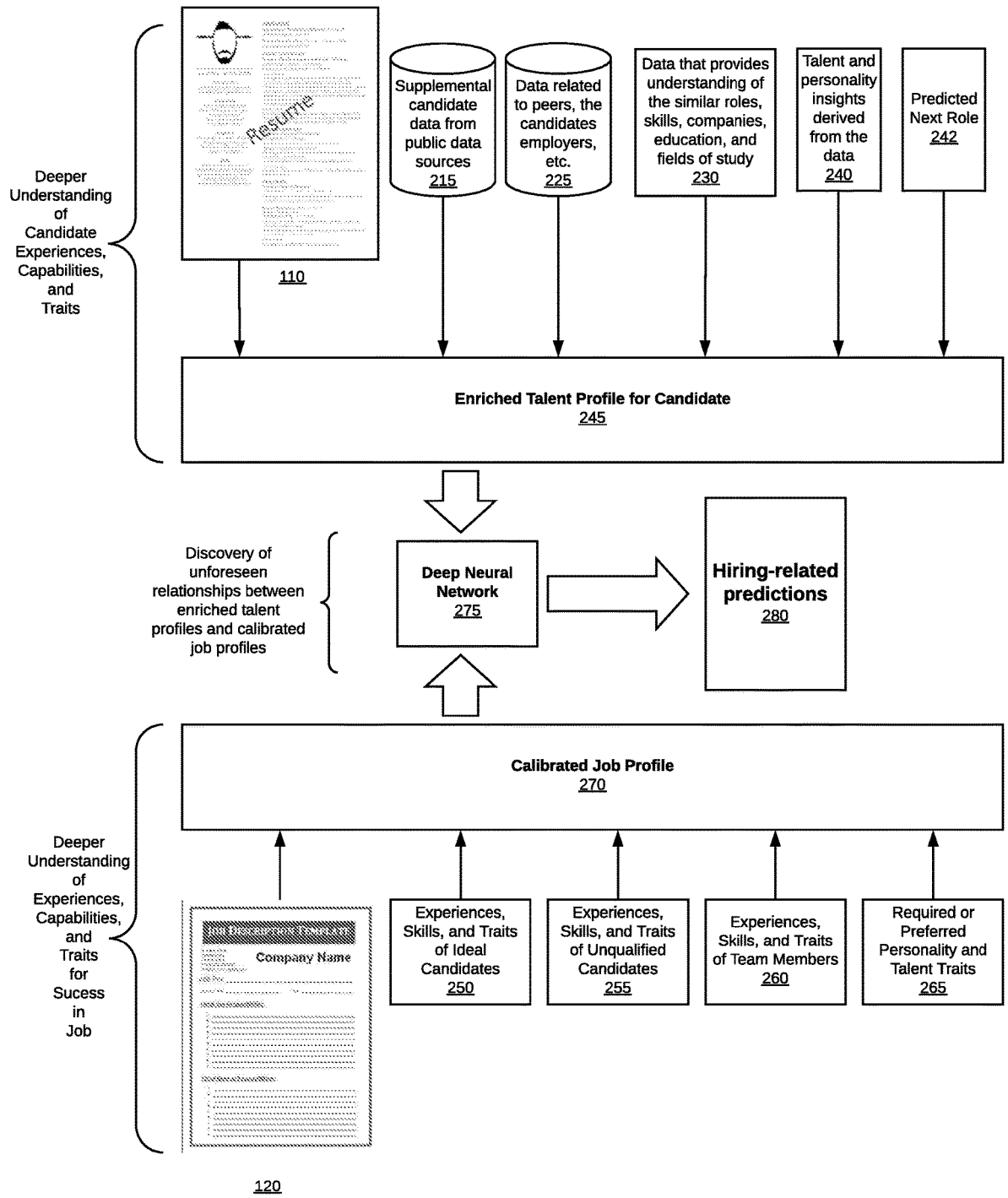
FIG. 2 is a block diagram that illustrates an overview of a method for obtaining hiring-related predictions according to one embodiment of the methods disclosed herein.

FIG. 2 illustrates an overview of the methods described herein.

1.1 Obtaining Deeper Understanding of Candidate's Experiences, Traits, and Capabilities (Creating an Enriched Talent Profile)

For each of plurality of candidates, the system obtains (a) profile data (e.g., resume data) for the candidate from an organization's HR data (110), (b) supplemental data related to the candidate from public data sources (215), and (c) data related to peers, the candidate's current employer, and other relevant entities from public and internal data sources (225). As is discussed in more detail below, the supplemental data and data related to peers and other relevant entities provide insight into the depth, breadth, and quality of candidate's capabilities and experiences. For roles, skills, companies, education, field of study, and/or other profile variables, the system identifies similar skills, companies, education, fields of study, etc. (230).

The system analyzes the above-describe data to derive further insights about the candidate, including personality and talent insights for the candidate (240) and a predicted next role for the candidate (242). The system creates an enriched talent profile (245) with the obtained data and the system-derived insights. A method for creating the enriched talent profile is described in more detail with respect to FIGS. 3 and 4.

1.2 Obtaining a Deeper Understanding of the Experiences, Traits, and Capabilities for Success in a Job (Creating a Calibrated Job Profile)

The system obtains a job description and job requirements (120) for an open job position. The system identifies ideal candidates for the job and their corresponding experiences, skills, and traits (250). Examples of ideal candidates are people who are currently or previously in the position, as well as previous successful applicants. The experiences, skills, and traits of ideal candidate are obtained by retrieving enhanced talent profiles for the ideal candidates. In certain embodiments, the system also identifies unqualified candidates for a position and their corresponding experiences, skills, and traits (255), as well as the experiences, skills, and traits of team members for the job (260).

The system also obtains required or preferred talent or personality traits for the job (265). Specifically, the system enables a user to select from certain talent and personality traits. The traits available for selection correspond to the talent and personality insights derived on the candidate side.

The system creates a calibrated job profile with the job description and requirements, the ideal candidates and their corresponding experiences, skills, and traits, and the required/preferred personality and talent traits (270). A method for creating the calibrated job profile is described in more detail with respect to FIGS. 5 and 6.

1.3 Matching Enriched Talent Profiles to Calibrated Job Profiles

The system matches the enriched talent profiles to the calibrated job profile using a deep neural network (DNN) (275). In the preferred embodiment, the output of the DNN is a plurality of hiring related predictions (e.g., probability of being interviewed, probability of being hired, and probability of being in the position after a period of time) (280). The hiring-related predictions are used to calculate a match score between the candidate and the job position. The match score represents the system prediction of which candidates are most likely to be hired and successful at the job position (i.e., the higher the match score, the greater the probability).

Methods for creating enhanced talent profiles and calibrated job profiles, as well as methods for training and using the DNN, are described in more detail below with respect to FIGS. 3-10.

4. Creating an Enriched Talent Profile

Figure 3:
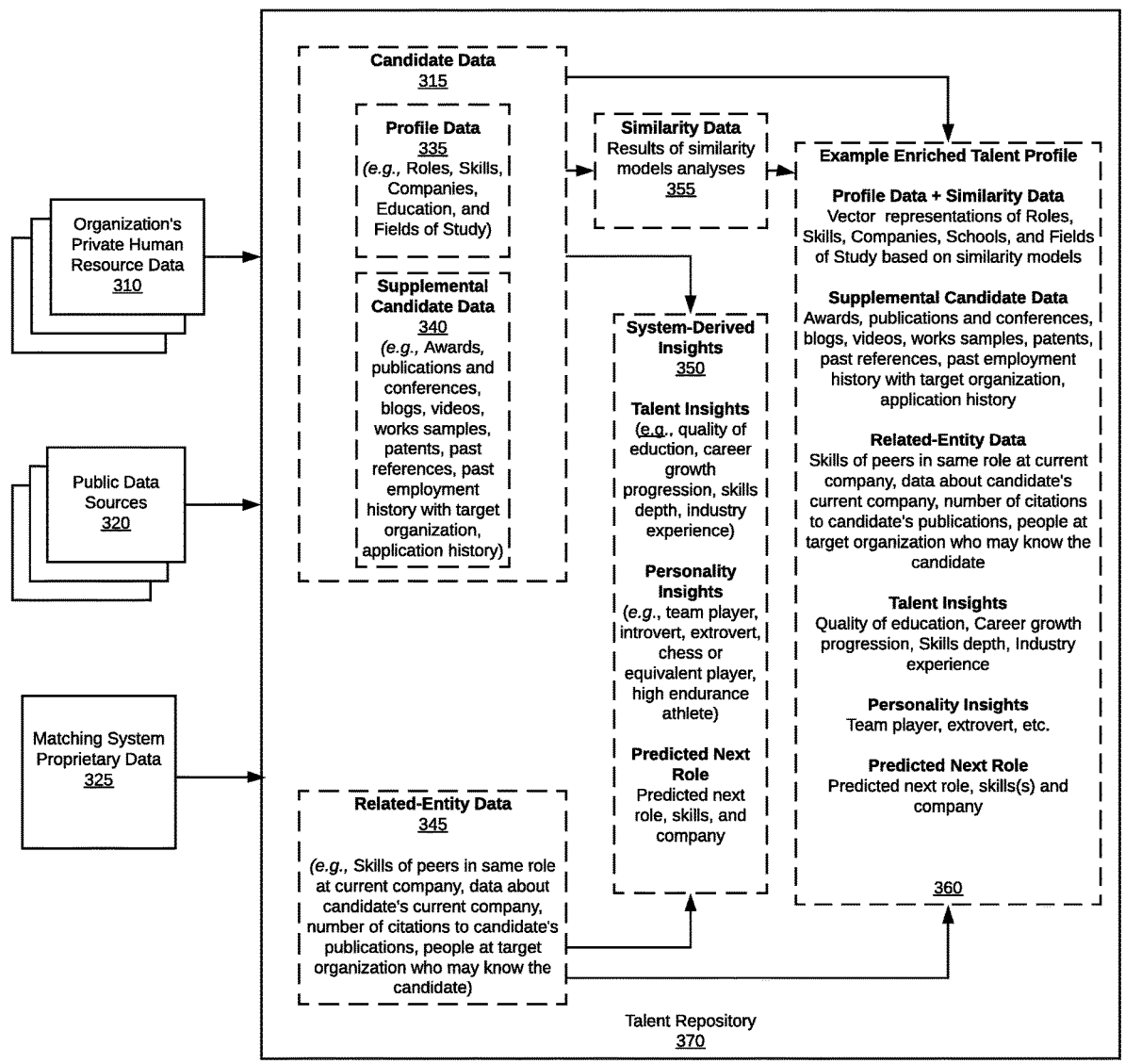
FIG. 3 is a block diagram that illustrates a method for creating an enhanced talent profile for a candidate according to one embodiment.

As stated above, an enriched talent profile is created for each of an organization's candidates. FIGS. 3 and 4 illustrates a method, according to one embodiment, for creating an enriched talent profile for a candidate.

2.1 Candidate Profile Data from Hiring Organization's HR Data

The system analyzes the organization's HR data (310) on candidates to extract values for the following categories of data: (1) employment roles held by the candidate and corresponding companies and skills associated with the roles, and (2) schools and fields of study associated with the candidate (collectively, "profile data") (step 410). In certain embodiments, profile data also includes the candidate's hobbies and interests. Profile data is provided by the candidate on a resume (or the like) or a profile page of a professional networking site. It primarily relates to a user's professional experiences and education, but may also include a candidate's hobbies and interests. In some cases, the system also obtains profile data from professional networking websites.

2.2. Understanding how the Candidate's Roles, Skills, Companies, and Education Relate to Other Roles, Skills, Companies, and Education The system analyzes the values extracted in step 410 in a way that enables the system to understand how the candidate's roles, skills, companies, and education relate to other past and current candidates' roles, skills, companies, and education at the present organization and elsewhere (step 420). In one embodiment, this step is performed by performing the following:

- The system analyzes profile data for candidates to obtain values for certain variables, such as roles, skills, companies, schools, and fields of study;
- For each type of variable, the system normalizes the variable values;
- The system builds a sequence for each variable and each candidate that reflects the order of the candidate's experiences;
- The system runs a similarity model on each sequence; and
- As a result of the similarity model, the system obtains a vector representation for each variable value, where vector representations of variable values are positioned in the vector space such that vectors that share common contexts in the candidates' profile data are located in close proximity to each other. See Mikolov, Tomas; et al. "Efficient Estimation of Word Representations in Vector Space." arXIV: 1301-3781, the contents of which are incorporated by reference herein.

This provides the system with an understanding of which roles are similar to other roles, which skills are similar to other skills, which schools are similar to other schools, which companies are similar to other companies, and which fields of study are similar to other field of study. For example, if, from an employment perspective, people move between a social networking company and a search engine company more frequently than they move between the search engine company and the petroleum company, then the system will understand that, from an employment perspective, the social networking company is more similar to the search engine company than the petroleum company. Likewise, if many people who know Hadoop also know Hbase, the system will understand that it is common for people who know Hadoop to learn Hbase and thus understand that these are similar skills.

2.3. Supplemental Candidate Data from Public Data Sources

The system also analyzes the public data sources (320) for candidate activity or work product published or posted on public sites ("supplemental candidate data") (step 430). Supplemental candidate data is indicative of a candidate's capabilities and obtained from sources other than the candidate's profile data. Examples of supplemental candidate data include awards given to the candidate, publications by the candidate and associated conferences, blog postings by the candidate, online work samples (e.g., Github postings), and patents on which the candidate is an inventor.

The system also may analyze the organization's private human resource data (310) and the system's own proprietary data (325) for supplemental candidate data. Examples of supplemental data from such sources include past references for the candidate, the candidate's past employment history with the organization (if any), and the candidate's past application history (if any) with the organization).

2.4 Related-Entity Data from Public and Proprietary Data Sources

Furthermore, the system analyzes public data sources and the system's own proprietary database for data pertaining to entities related to the candidate's experiences ("related-entity data") (step 440). Examples of related-entity data are skills of peers in the same role as the candidate at the candidate's current company, data about the candidate's current company, the number of citations to the candidate's publications, rankings for a candidate's schools, and people at the target organization who may know the candidate. Related-entity data includes data that cannot be obtained from a candidate's resume or supplied by the candidate. In some cases, the system may also obtain related-entity data from the organization's private human resource data.

2.5 Talent Insights and Personality Insights Derived by the System

The system derives insights about the candidate's personality and the candidate's professional talents from the candidate profile data, the supplemental candidate data, and the data related to other related entities (step 450). In one embodiment, the system has certain personality and talent classification categories. For each classification category, the system analyzes the profile data, supplemental data, and related-entity data to determine whether the candidate meets the classification criteria. Example of personality classifications include "team player", "introvert," "extrovert," "analytical game player," "high endurance athlete." Criteria for being a "team player" may be that the candidate play one or more team sports. For example, if the candidate plays basketball and soccer, the system may classify the candidate as a "team player." Criteria for being an "extrovert" may include public speaking or participation in certain types of groups or clubs (e.g., fraternities, sororities, etc.). In such case, if the candidate is a public speaker, the system will classify the candidate as an "extrovert." If the candidate runs marathons, the system may classify the candidate as a "high endurance athlete." If the candidate plays chess or other mental strategy game, the system may classify the candidate as a "analytical game player." If the candidate has more than a threshold number of cites to his/her publications, or is followed a lot on one or more social or professional networking sites, the system may classify the candidate as an "influencer."

Examples of talent categories include "top 20% school" or "top 20% growth progression in role." The system may analyze school ranking from various external sources to determine if the candidate attended a top 20% school. Likewise, the system may determine if the candidate is in the top x % (e.g., top 20%) in terms of career growth progression by performing the following:

- Identify people who have currently or previously had the same role as the candidate at the candidate's current employer (i.e., peers);
- For each of the identified peers, determine many years since finishing schooling that it took the peer to achieve the role;
- Determine the number of years it took the candidate to achieve the role since finishing schooling;
- Normalize to account for career breaks and role changes (e.g., do not count time taken off for parental leave); and
- Calculate whether the number of years it took the candidate is within the top x %.

Current and previous peers may be identified from public professional networking sites and/or from the system's own proprietary data.

Other talent or personality insights may not be based on classifications. For example, for each of the candidate's current skills, the system may determine the percentage of or number of peers at the candidate's current company or similar companies also list the same skills. The system may associate the percentage/number for a skill with an indicator of the candidate's depth in that skill (i.e., the more peers that have that skill, the deeper the candidate's depth in that skill is likely to be). The system may also use peer and candidate data to derive an indicator of the candidate's experience in an industry.

2.6 Predicted Next Role

In one embodiment, system-derived insights about a candidate also include the candidate's predicted next role, next company, and next skills (step 455). The system predicts a next role using a neural network that is trained using the employment history of many candidates (preferably across organizations). The system may also use the neural network to predict next skills and next companies for the candidate. In one embodiment, the system trains an RNN (separate from the matching DNN) to predict the next role, the next skills, and/or next company for each candidate in the talent repository ("the role-prediction RNN"). To train the role-prediction RNN, the system creates an input vector/array for each of a plurality of candidates that includes the following:

- For each previous role listed in a candidate's resume, a vector representation of the role, a vector representation of the corresponding company, and a vector representation of the corresponding skills.
- For each school listed in the resume, a vector representation of the school and a vector representation of the corresponding field of study.

In other words, the input vector created for each candidate includes sub-vectors, which are the vector representation of past roles, skills, companies, and schools in a similarity model space (see discussion in Section 2.2). Each candidate's vectors are applied to the role-prediction RNN as input along with a corresponding target variable. The target variable for each candidate is a vector that includes a vector representation of the candidate's current role, skills, and company. This results in an RNN model that predicts a candidate's next role, skills, and/or company.

The candidate data used to train the role-prediction RNN need not be limited to a particular organization's candidates. The more candidate data used to train the role-prediction RNN, the better it will be at predicting next roles and skills.

2.7 Enriched Talent Profile

The system creates an enriched talent profile for the candidate that includes the profile data (335); the similarity data 355; the supplemental candidate data (340); the related-entity data (345), the system-derived insights (350) (step 460).

3. Creating a Calibrated Job Profile

Figure 5:
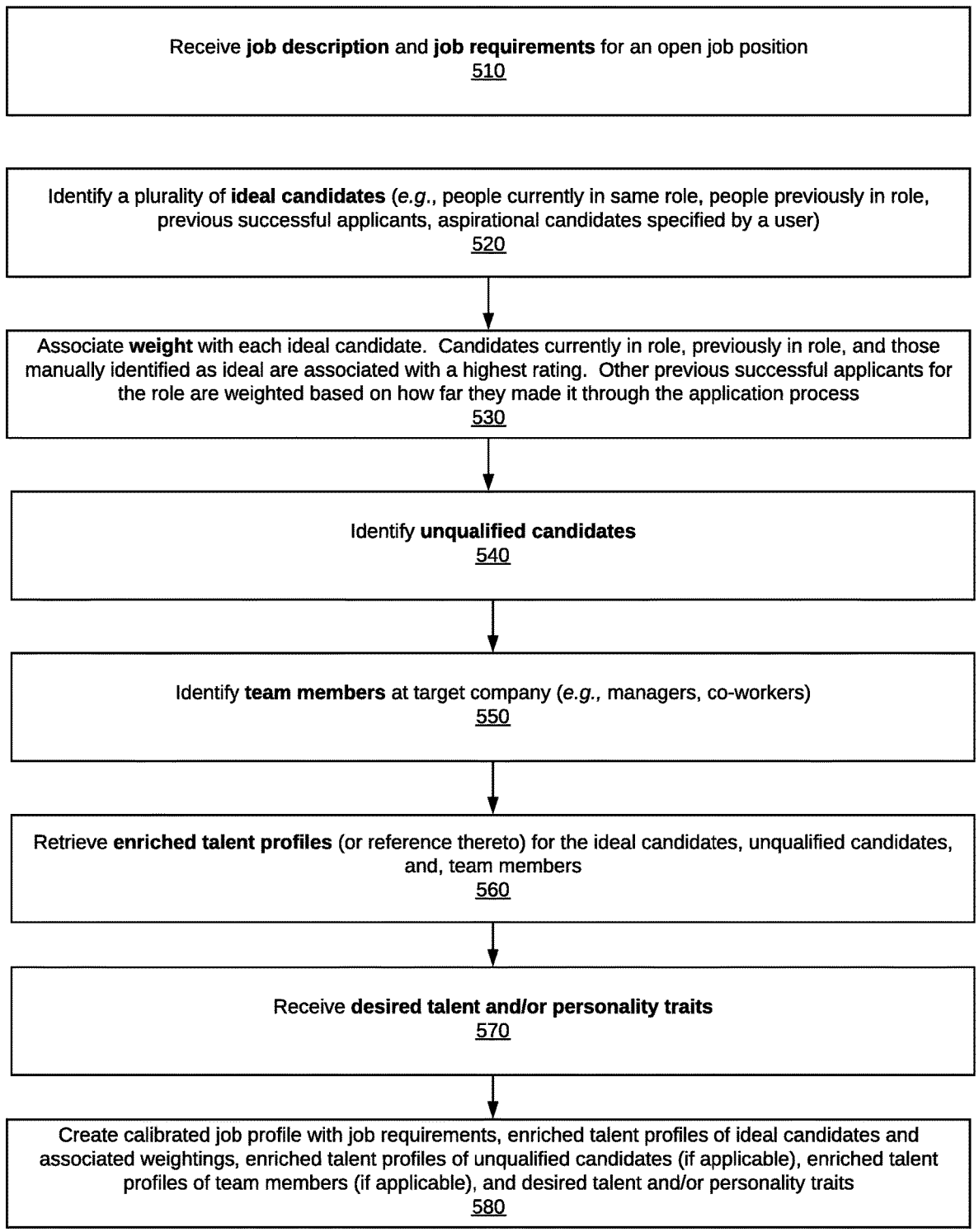
FIG. 5 is a flowchart that illustrates a method for creating a calibrated job profile for a candidate according to one embodiment.
Figure 6:
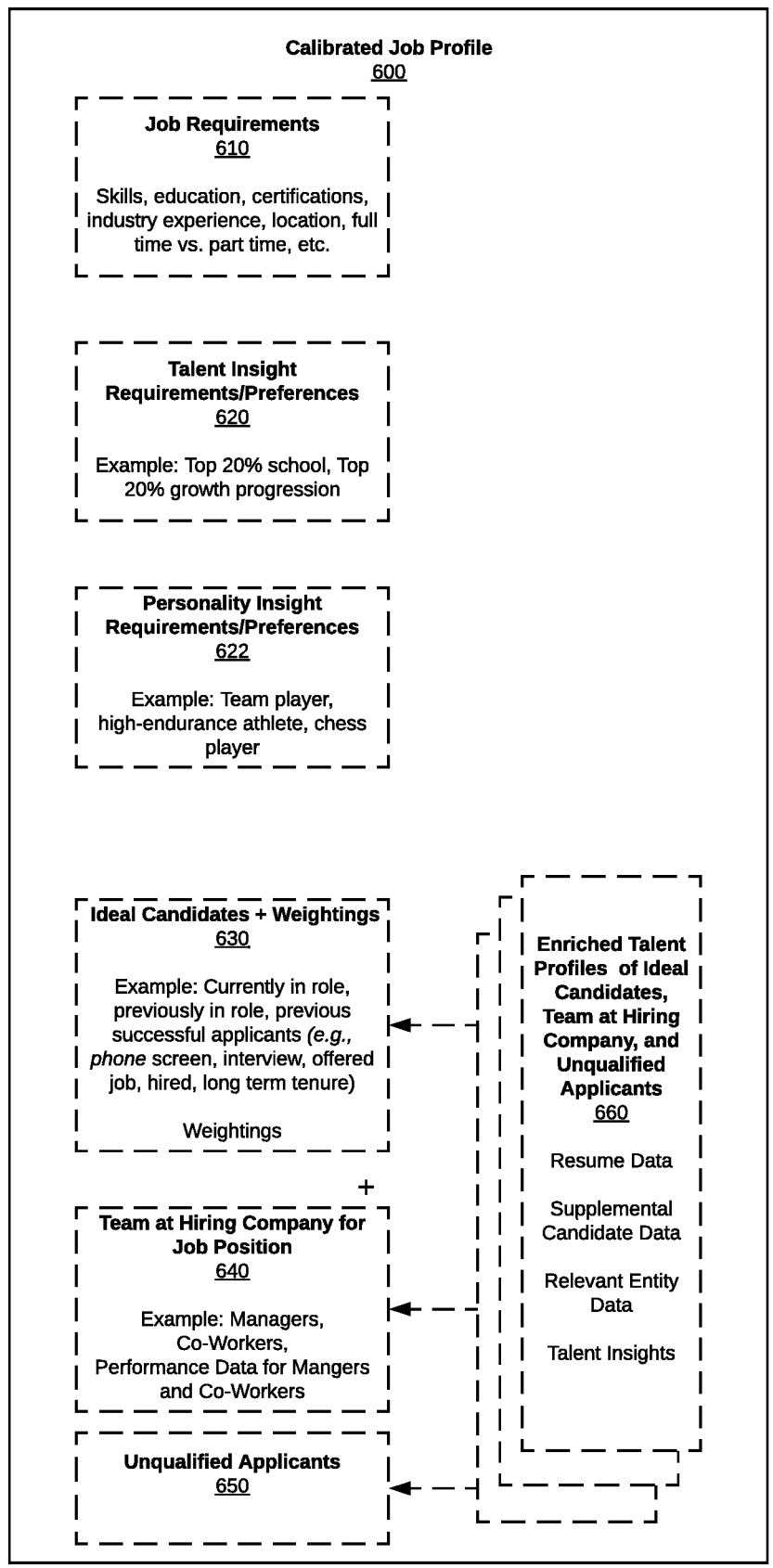
FIG. 6 is a block diagram that illustrates a method for creating a calibrated job profile for a candidate according to one embodiment.

FIGS. 5 and 6 illustrate a method for creating a calibrated job profile according to one embodiment.

3.1 Job Description and Requirements

The system initiates the process of creating a calibrated job profile in response to receiving a job description and job requirements for an open job position (step 510). This data is entered by a user, such as an HR manager, via a user interface provided by the system.

In certain embodiments, the system uses the results of its similarity analysis for many candidates (see section 2.2 above) to guide the user in selecting job requirements or preferences. If a user selects a particular skill for a job requirement, the system displays other similar skills in the user interface for consideration to add to the job requirement. For example, if an HR manger selects "UX Design" for a skill for a job opening, the system may suggest "User Interface Design," "Graphic Design," and "Web Design" as other skills to add to the job requirements. The same could be done for role titles, company names, etc.

3.2 Ideal Candidates for the Role and their Experiences, Skills, and Traits

To create a calibrated job profile, the system identifies a plurality of ideal candidates for the job position (step 520). Examples of ideal candidates are people who are currently in the same role, people who were previously in the same role, and other previous successful applicants. These may be people at the hiring organization or elsewhere. The system identifies such people by analyzing the hiring organizations human resource data, public data sources, and the system's own proprietary data for people who are currently in the role, previously in the role, or previously applied for the role at the hiring organization or elsewhere (e.g., similar companies to the organization). In addition, a user may specify ideal candidates via the system's user interface.

The system obtains the experiences, skills, and traits of the ideal candidates by retrieving or referencing the enriched talent profiles of the ideal candidates (see step 560). If one of the ideal candidates does not yet have an enriched talent profile, the system creates an enriched talent profile for such candidate.

The system associates a weight with each of the identified ideal candidates (step 530). Candidates currently in the role (at the hiring organization or elsewhere), candidates previously in the role (at the hiring organization or elsewhere), and user-identified ideal candidates are associated with the highest weighting. Other previous successful candidates are weighted based on how far they made it through the hiring position. For example, ideal candidates may be weighted on a 1-4 scale, with 4 being the most weight, based on the following:

Weight 4: Candidates currently in role, previously in role, or user-identified ideal candidates.

Weight 3: Candidates offered a position in the role (but did not accept).

Weight 2: Candidate who made it to an in-person interview stage.

Weight 1: Candidates who made it only to the telephone interview stage.

3.3 Unqualified Candidates for the Role and their Experiences, Skills, and Traits In certain embodiments, the system also identifies unqualified candidates for the position and their corresponding experiences, skills, and traits (step 540). For example, the system may analyze the hiring organization's human resource data and the system's own proprietary data to identify candidates previously rejected for the role by the hiring organization or other similar companies/organizations. The system obtains the experiences, skills, and traits of the unqualified candidates by retrieving or referencing the enriched talent profiles of the unqualified candidates (see step 560).

3.4 Team Members at the Organization and their Experiences, Skills, and Traits In certain embodiments, a calibrated job profile also includes the role's team members at the hiring organization and their corresponding experiences, skills, and traits. In these embodiments, the system analyzes the hiring organization's private HR data to identify the team members for the role (step 550). Examples of team members are the people who will be the managers or co-workers of the person hired for the role. The system obtains the experiences, skills, and traits of team member by retrieving or referencing the enriched talent profiles of the team members (step 560).

3.5 Preferred or Required Talent and Personality Traits

As stated above, the system provides a user interface where an HR manager (or other user) can enter requirements for an open job position. The user interface also enables the HR manager to select one or more preferred or required talent and/or personality traits for the job opening. The types of talent and personality traits available for a user to select corresponding to the type of talent and personality insights derived by the system in created the enriched talent profiles for candidates. For example, if the talent and personality insights derived by the system in creating the enriched talent profiles include "top 20% school," "top 20% career growth progression," and "team player," then these are requirement/preferences that an HR manager can select for the open job position.

In creating a calibrated job profile, the system identifies any talent or personality traits selected by the user for the job position (step 570).

3.6 Calibrated Job Profile

As illustrated in FIG. 6, the system creates a calibrated job profile for the open position with the following (step 580):

Job requirements (610) (e.g., skills, education, certifications, industry experience, location, full time vs. part time, etc.);

Enriched talent profiles (660) of the identified "ideal candidates," plus associated weightings (630);

Enriched talent profiles (660) of identified "unqualified candidates" (650) (in certain embodiments);

Enriched talent profiles (660) of identified team members 640 (in certain embodiments); and Any desired talent or personality traits (620, 622) entered for the job position

4. Training the Deep Neural Network for the Matching Process

Figure 7:
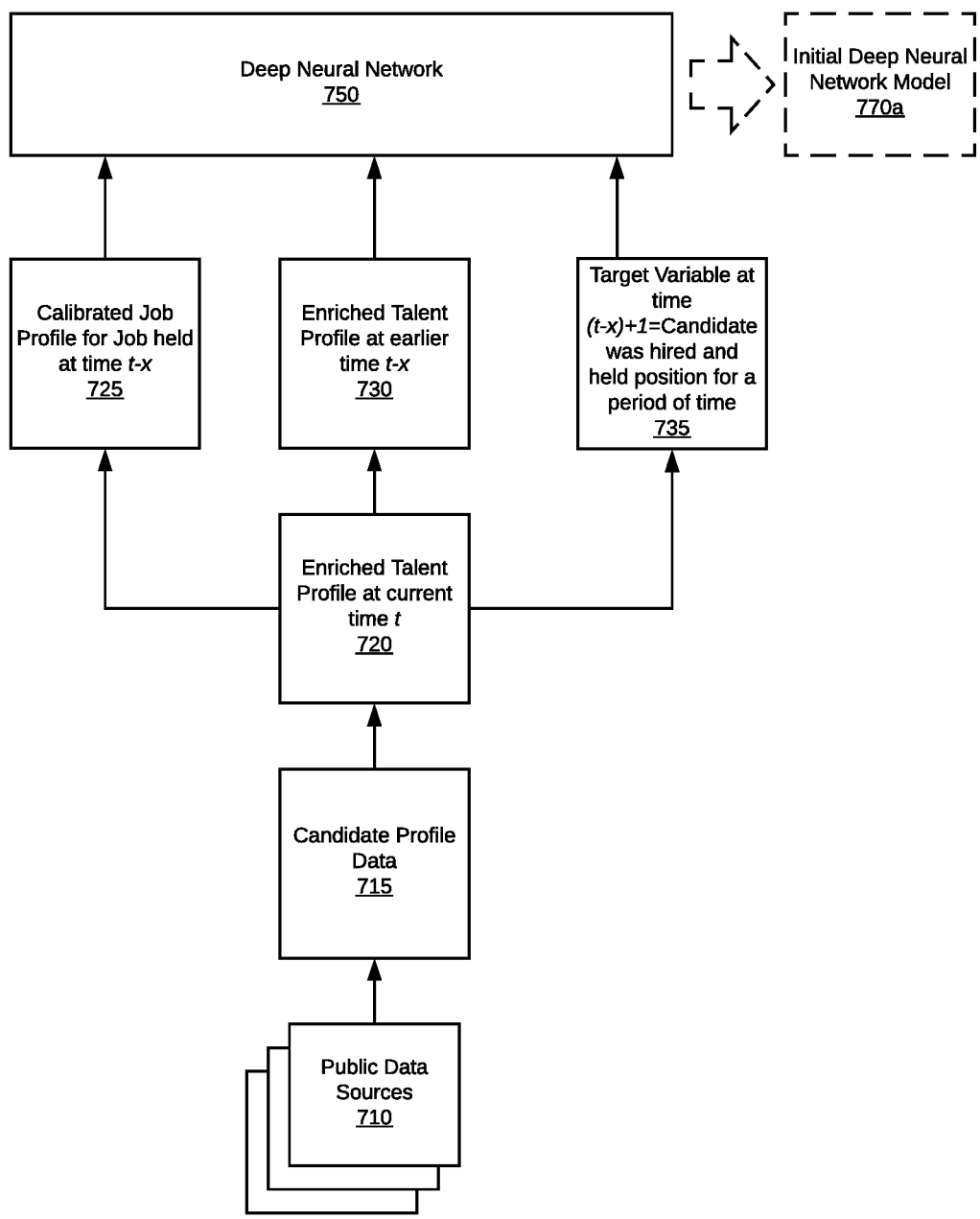
FIG. 7 is a block diagram flow that illustrates a method for initially training a deep neural network according to one embodiment.
Figure 8:
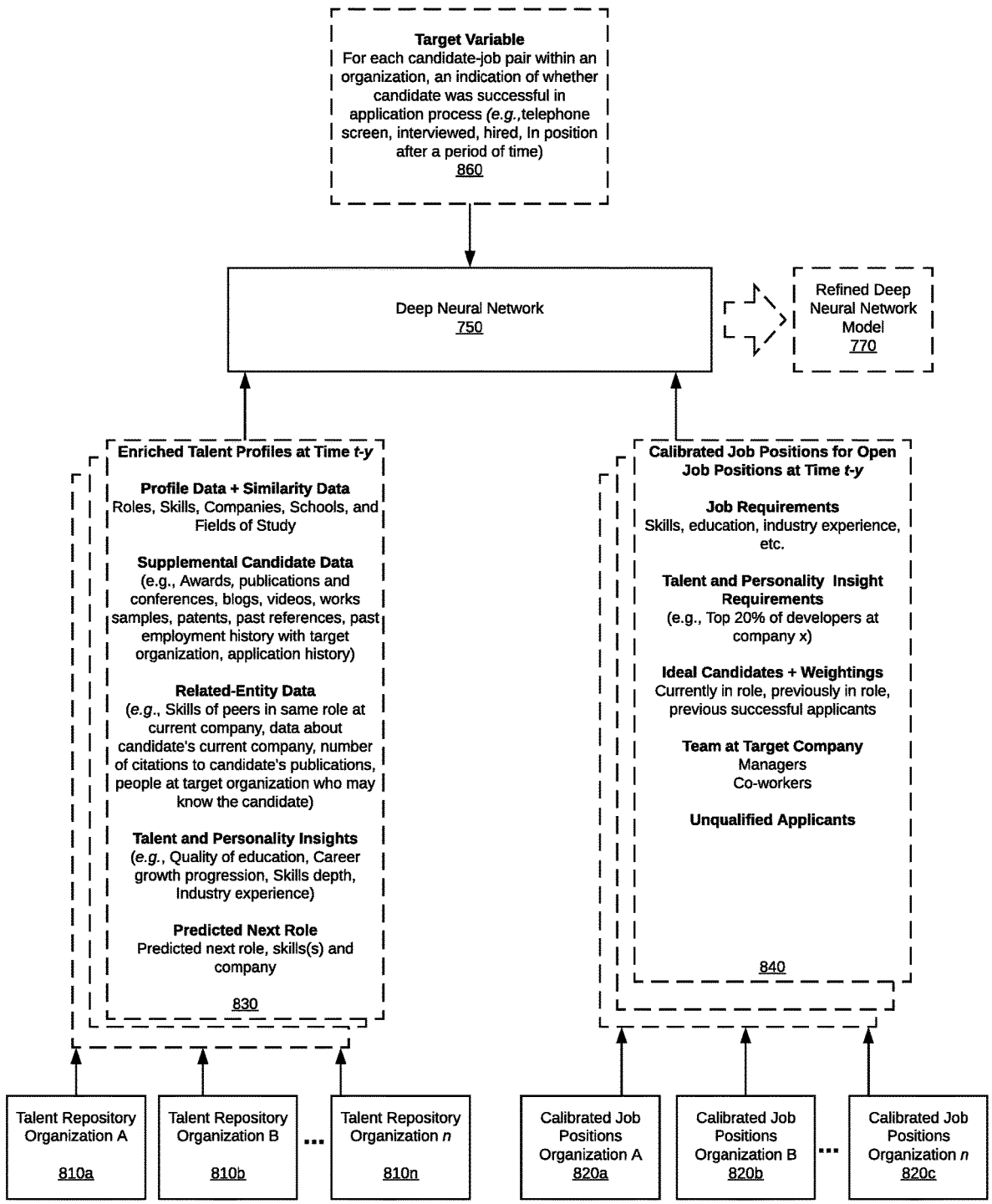
FIG. 8 is a block diagram flow that illustrates a method for refining a deep neural network according to one embodiment.

FIGS. 7 and 8 illustrate a method for training the deep neural network to make hiring-related predictions with respect to a candidate-job position pair. Specifically, FIG. 7 illustrates a method for initially training the model using publicly-available data, and FIG. 8 illustrates a method for refining the model using private enterprise/organization data.

Referring to FIG. 7, the system analyzes public data sources (710) for candidate profile information for a number of people. Examples of such public data sources are website in which people post professional experience data. For each of a number of candidates, the system obtains candidate profile data (715) from the public data source(s) and creates an enriched talent profile (720) for the candidate at a current time t in accordance with the methods described with respect to FIGS. 3 and 4. The system then identifies a job held by the candidate at an earlier time t–x. The system creates a calibrated job profile (725) for the position at time t–x and creates an enriched talent profile (730) for the candidate at time t–x. The system then inputs data from the enriched talent profile t–x and the calibrated job position at time t–x into the deep neural network, along with a target variable at time (t–x)+1 that indicates the user obtained the job (735). This results in a preliminary model (770*a*) for the deep neural network (750). This process can be done for each job held by a candidate. For example, assume the candidate had a different job at time (t–y)+1. In such case, the system also may create an enhanced talent profile for the candidate at time t-y and created a calibrated job profile for the job at time t-y.

FIG. 8 illustrates a method for refining the deep neural network model using an organization's human resource data. The system analyzes the organization's HR data to identifies job openings at earlier times (e.g., time t–x, t–y, etc.). For each of the identified job openings, the system identifies the organization's candidates at that time and creates enriched talent profiles for those candidates at that time. For example, if the organization had a job opening at time t–y, then the system creates enriched talent profiles for the then-existing candidates as the profiles would have been t-y (830). The system also creates the calibrated job profile as the profile would have been at time t–y (840). Each enriched talent profile/calibrated job profile pair is inputted into the deep neural network (750). The pair is inputted along with a target variable (860) at time (t–y)+1 that indicates whether the candidate in the pair was successful in the application process, and, if so, the degree of success (e.g., telephone screen, interviewed, hired, in position after a period of time). In one embodiment, the model is refined using data from a plurality of different organizations (810*a*-*c*, 820*a-c*).

Through the training process, the DNN is able to discover interesting and unforeseen relationships between data in the enriched talent profiles and the calibrated job positions. For example, for each role, the DNN is able to discover which relationships between a candidate's experiences, skills, and traits and the identified ideal candidate's experiences, skills, and traits are most relevant in predicting hiring success for a job.

Furthermore, the vector representations for certain profile variables, such as roles, skills, companies, schools, and fields of study, provide the DNN with an understanding of which roles are similar to other roles, which skills are similar to other skills, which schools are similar to other schools, which companies are similar to other companies, and which fields of study are similar to other field of study. This in turn enables the DNN to discover during the training process the effect of these relationships on the matching process.

The deep neural network model also can be trained using either the methods of FIGS. 7 and 8 alone.

5. Matching Process

Figure 9:
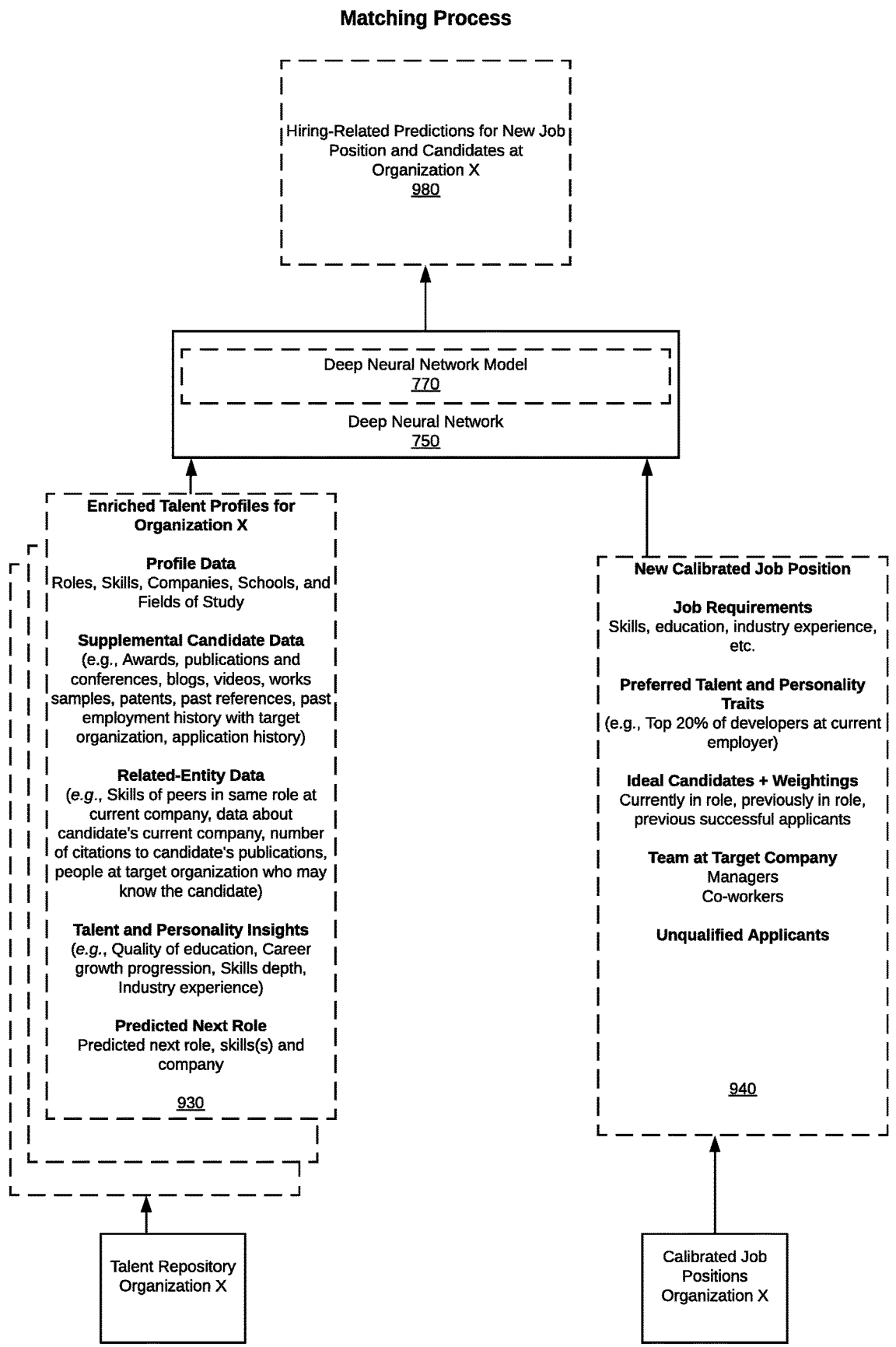
FIG. 9 is a block diagram flow that illustrates a matching method for according to one embodiment.

FIG. 9 illustrates a pictorial representation of the matching process. A calibrated job profile (940) is created for a job opening at Organization X. Enriched talent profiles (930) are created for candidates at Organization X. For each job-candidate pair, data from the calibrated job profile and the candidates enriched talent profile are inputted into the DNN 750. The DNN 750 outputs one or more hiring-related predictions (980) for each pair, resulting in a match score for each of the inputted candidates at Organization X. Examples of hiring-related predictions are the probability of the candidate being interviewed, the probability of the candidate being hired, and the probability of the candidate being successful in a job after a period of time (e.g., 1 year).

In one embodiment, the match score is calculated as follows:
- The system receives a plurality of hiring-related predictions for each candidate/job pair
- The system multiples each probability by a weight from 0-1 (e.g., 0.6 for probability of being successful in a job after a period of time, 0.3 for the probability of being hired, and 0.1 for the probability of being interviewed
- System adds the weighted probabilities to obtain a match score 6. Displaying Ranked Lists of Candidates The system ranks the candidates for the new job opening based on the match score. The system displays the n highest ranked of the candidates in the user interface along with an indicator of each candidate's match score. In the preferred embodiment, candidates are displayed in order of their match score, and n is less than the total number of candidates in the organization's candidate pool.

7. Refining Calibrated Job Profile in Response to Matching Results

The system enables a user to refine or change the job requirements after seeing the ranked list of candidates. For example, a user may want to add or change the skills associated with the job. If the user edits the job requirements/preferences, the system creates a new calibrated job profile for the job and reperforms the matching process.

8. Example System Architecture

Figure 10:
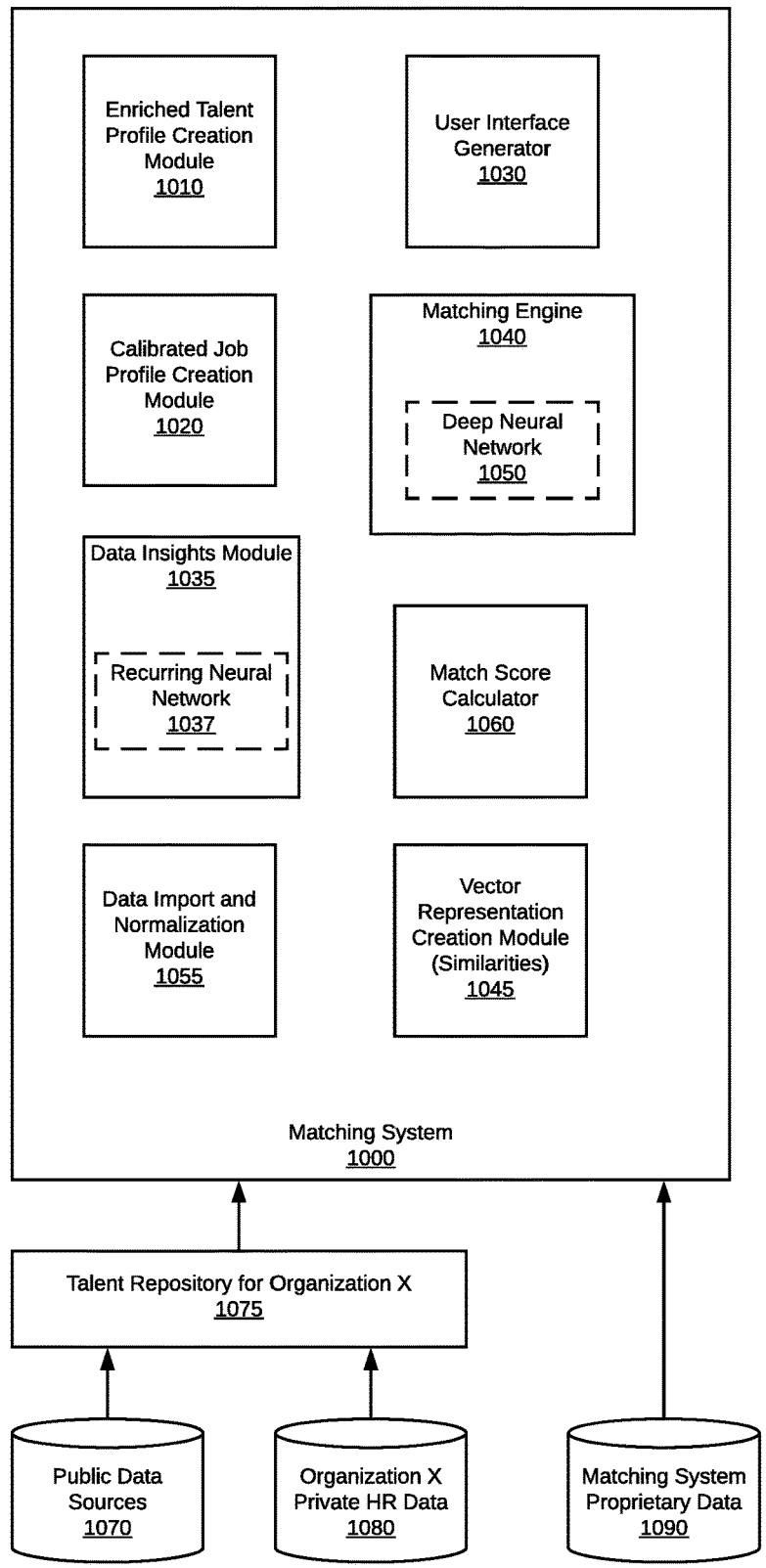
FIG. 10 is a block diagram that illustrates an example software architecture according to one embodiment.

FIG. 10 illustrates an example architecture for the system. The methods described herein may be implemented in other systems and are not limited to the system 1000.

As described above, the system obtains candidate and other data from an organization's HR data 1080 and public data sources 1070. Data related to the organization's candidates is imported into a talent repository 1075 for the organization. The talent repository is a database or other computer-readable storage device. Examples of an organization's candidate pool include past and current applicants, past and current employees, past and current contractors, and referrals.

The system also has its own proprietary data 1090 with its history of matching enriched talent profiles to calibrated job positions across a variety of organizations. In certain embodiments, this data is used to train the DNN, obtain peer data, identify ideal and unqualified candidate for a calibrated job profile, and create vector representations of values for roles, skills, companies, schools, and fields of study.

A data import and normalization module 1055 imports data into the system and normalizes data values. A vector representation creation module 1045 creates the vector representations of profile variable values described in Section 2.2. Data insights module 1035 derives the personality and candidate data insights, as well as the predicted next roles. Data insights module 1035 uses RNN 1037 to predict a candidate's next role. The enriched talent creation profile module 1010 creates the enriched talent profiles, which are stored in talent repository 1075.

The user interface generator 1030, generates the user interface screens. This includes the screens that enable a user to enter information for an open job position (e.g., job requirements, manually-identified ideal candidates, etc.), as well as the screens with the matching results. The calibrated job profile creation module 1020 creates the calibrated job positions. The matching engine 1040 matches enhanced talent profiles to calibrated job positions using DNN 1050 and outputs one or more hiring-related predictions for each candidate-job pair inputted into the engine. The match score calculation 1060 calculates match scores for candidate/job pairs using the hiring-related predictions outputting by the matching engine 1040.

9. General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

What is claimed is:

1. A method for predicting a match between a candidate and a job position for an organization, the method comprising:
   generating, by a computing system comprising one or more processors, an enriched talent profile associated with the candidate, the enriched talent profile comprising first characteristic values and second characteristic values, wherein the first characteristic values relate to characteristics being stored in a database as possessed by the candidate, and second characteristic values are predicted values by executing a first neural network module;
   generating, by the computing system, a calibrated job profile for the job position, the calibrated job profile comprising job requirements for the job position; and
   executing, by the computing system, a second neural network module using the enriched talent profile and the calibrated job profile as inputs to calculate one or more hire-related prediction values for the candidate;
   wherein the second neural network module is a deep neural network (DNN) module, the method further comprising:
      receiving the DNN module trained by adjusting at least one parameter associated with the DNN module based on a training enriched talent profile, a training calibrated job profile, and a training match score between the training enriched talent profile and the training calibrated job profile.

2. The method of claim 1, further comprising: generating, by the computing system comprising one or more processors, an enriched talent profile associated with the candidate, the enriched talent profile comprising first characteristic values and second characteristic values, wherein the first characteristic values relate to characteristics being stored in a database as possessed by the candidate, and second characteristic values are predicted values by executing a first neural network module, further comprises:
   receiving, by the computing system, the first neural network module trained by adjusting at least one parameter associated with the first neural network module;
   identifying the first characteristic values from a talent profile of the candidate derived from a first data source of the enterprise and from a second data source independent from the first data source; and
   executing the first neural network module using a first talent profile of the candidate as an input to calculate the second characteristic values.

3. The method of claim 2, wherein the first neural network module comprises a recurrent neural network (RNN) module, and wherein the RNN module is trained using employment histories associated with a plurality of prior candidates of the organization or other organizations.

4. The method of claim 2, wherein the first characteristic values comprise at least one of a skill, a role, or a company associated with the candidate, and wherein the second characteristic values comprise at least one of a predicted skill, a predicted role, or a predicted company associated with the candidate.

5. The method of claim 2, further comprising:
   obtaining the talent profile of the candidate from a human resource (HR) database of the first data source of the enterprise, wherein the talent profile of the candidate comprises at least one of an employment role held by the candidate and skills associated with the role or a school and a field of study associated with the candidate; and
   retrieving, from the second data source through a network communicatively coupled to the computing system, at least one of candidate's social network profile or a published work product, and generating one or more supplemental data items based on the at least one of the candidate's social network profile or the published work product.

6. The method of claim 1, wherein the enriched talent profile further comprises at least one of:
   first data items relating to at least one of peers of the candidate or the candidate's employer, and wherein the peers are employees at candidate's current employer,
   second data items relating to skills, companies, roles, schools, and fields of study that are determined, based on a similarity model, to be similar to candidate's skills, companies, roles, schools, and fields of study,
   third data items relating to at least one of a personality or a talent assessment for the candidate based on the talent profile and at least one of one or more supplemental data items, the first data items, or the second data items, or
   a future data item generated using the first neural network module for the candidate relating to at least one of a future role or a future company for the candidate.

7. The method of claim 1, wherein generating, by the computing system, a calibrated job profile for the job position further comprises:
   receiving, using a machine programming interface, desired personality trait associated with the job position, wherein the desired personality trait is selectable using the machine programming interface;
   identifying one or more target candidates for the job position, wherein the one or more target candidates are associated with corresponding experiences, skills, and personality trait matching requirements for the job position; and generating the calibrated job profile to include the job requirements or desired personality trait, and one or more enriched talent profiles of the one or more target candidates, wherein the one or more enriched talent profiles of the one or more target candidates comprise the experiences, skills, and personality and trait associated with the one or more target candidates.

8. The method of claim 1, wherein the one or more hire-related prediction values comprise at least one of a probability to be interviewed, a probability of being hired, or a probability of working in the job position for a period of time.

9. The method of claim 1, further comprising:
calculating a match score based on the one or more hire-related prediction values; and
presenting, in a first user interface, the candidate in a ranked list including a plurality of candidates at a ranking position determined according to the calculated match score value.

10. The method of claim 1, wherein the enriched talent profile further comprises at least one of a hobby, a personal interest of the candidate, a reference for the candidate, candidate's past employment activity, or the candidate's past application history with an employer posting the job position, and wherein one or more supplemental data items further comprise at least one of an award earned by the candidate, an academic publication by the candidate, an Internet media content authored by the candidate, or a work sample submitted to a public forum by the candidate.

11. A computing system for automatically predicting a match between a candidate and a job position for an enterprise, the computing system comprising:
a memory to store instructions; and
one or more processors, communicatively coupled to the memory, to:
generate an enriched talent profile associated with the candidate, the enriched talent profile comprising first characteristic values and second characteristic values, wherein the first characteristic values relate to characteristics being stored in a database as possessed by the candidate, and second characteristic values are predicted values by executing a first neural network module;
generate a calibrated job profile for the job position, the calibrated job profile comprising job requirements for the job position; and
execute a second neural network module using the enriched talent profile and the calibrated job profile as inputs to calculate one or more hire-related prediction values for the candidate;
wherein the second neural network module is a deep neural network (DNN) module, the one or more processors are further to receive the DNN module trained by adjusting at least one parameter associated with the DNN module based on a training enriched talent profile, a training calibrated job profile, and a training match score between the training enriched talent profile and the training calibrated job profile.

12. The computing system of claim 11, wherein to generate an enriched talent profile associated with the candidate, the enriched talent profile comprising first characteristic values and second characteristic values, wherein the first characteristic values relate to characteristics being stored in a database as possessed by the candidate, and second characteristic values are predicted values by executing a first neural network module, the one or more processors are further to:
receive the first neural network module trained by adjusting at least one parameter associated with the first neural network module;
identify the first characteristic values from a talent profile of the candidate derived from a first data source of the enterprise and from a second data source independent from the first data source; and
execute the first neural network module using a first talent profile of the candidate as an input to calculate the second characteristic values.

13. The computing system of claim 12, wherein the first neural network module comprises a recurrent neural network (RNN) module, and wherein the RNN module is trained using employment histories associated with a plurality of prior candidates of the organization or other organizations.

14. The computing system of claim 12, wherein the first characteristic values comprise at least one of a skill, a role, or a company associated with the candidate, and wherein the second characteristic values comprise at least one of a predicted skill, a predicted role, or a predicted company associated with the candidate.

15. The computing system of claim 12, wherein the one or more processors are further to:
obtain the talent profile of the candidate from a human resource (HR) database of the first data source of the enterprise, wherein the talent profile of the candidate comprises at least one of an employment role held by the candidate and skills associated with the role or a school and a field of study associated with the candidate; and
retrieve, from the second data source through a network communicatively coupled to the computing system, at least one of candidate's social network profile or a published work product, and generating one or more supplemental data items based on the at least one of the candidate's social network profile or the published work product.

16. The computing system of claim 11, wherein the enriched talent profile further comprises at least one of:
first data items relating to at least one of peers of the candidate or the candidate's employer, and wherein the peers are employees at candidate's current employer,
second data items relating to skills, companies, roles, schools, and fields of study that are determined, based on a similarity model, to be similar to candidate's skills, companies, roles, schools, and fields of study,
third data items relating to at least one of a personality or a talent assessment for the candidate based on the talent profile and at least one of one or more supplemental data items, the first data items, or the second data items, or
a future data item generated using the first neural network module for the candidate relating to at least one of a future role or a future company for the candidate.

17. The computing system of claim 11, wherein to generate a calibrated job profile for the job position, the one or more processors are further to:
receive, using a machine programming interface, desired personality trait associated with the job position, wherein the desired personality trait is selectable using the machine programming interface;
identify one or more target candidates for the job position, wherein the one or more target candidates are associated with corresponding experiences, skills, and personality trait matching requirements for the job position; and generate the calibrated job profile to include the job requirements or desired personality trait, and one or more enriched talent profiles of the one or more target candidates, wherein the one or more enriched talent profiles of the one or more target candidates comprise the experiences, skills, and personality and trait associated with the one or more target candidates.

18. The computing system of claim 11, wherein the one or more hire-related prediction values comprise at least one of a probability to be interviewed, a probability of being hired, or a probability of working in the job position for a period of time, and wherein the one or more processors are further to:

calculate a match score based on the one or more hire-related prediction values; and present, in a first user interface, the candidate in a ranked list including a plurality of candidates at a ranking position determined according to the calculated match score value.

19. The computing system of claim 11, wherein the enriched talent profile further comprises at least one of a hobby, a personal interest of the candidate, a reference for the candidate, candidate's past employment activity, or the candidate's past application history with an employer posting the job position, and wherein one or more supplemental data items further comprise at least one of an award earned by the candidate, an academic publication by the candidate, an Internet media content authored by the candidate, or a work sample submitted to a public forum by the candidate.

20. A non-transitory computer-readable medium comprising machine-executable code that, when executed by a computing system comprising one or more processors, enables the computing system to perform operations that automatically predict a match between a candidate and a job position for an enterprise, the operations comprising:

generating, by the computing system comprising one or more processors, an enriched talent profile associated with the candidate, the enriched talent profile comprising first skills and second skills, wherein the first skills are being stored in a database as possessed by the candidate, and second skills are predicted values by executing a first neural network module;

generating, by the computing system, a calibrated job profile for the job position, the calibrated job profile comprising job requirements for the job position; and executing, by the computing system, a second neural network module using the enriched talent profile and the calibrated job profile as inputs to calculate one or more hire-related prediction values for the candidate;

wherein the second neural network module is a deep neural network (DNN) module, the operations further comprising:

receiving the DNN module trained by adjusting at least one parameter associated with the DNN module based on a training enriched talent profile, a training calibrated job profile, and a training match score between the training enriched talent profile and the training calibrated job profile.

* * * * *